No. 847,536. PATENTED MAR. 19, 1907.
H. ZIMMERMAN.
APPARATUS FOR FEEDING AND CUTTING MULTIPLE FABRICS.
APPLICATION FILED JUNE 27, 1906.

2 SHEETS—SHEET 2.

Witnesses
J. G. Hinkel
J. J. McCarthy

Inventor
Harry Zimmerman
by
Foster Freeman Watson
Attorneys

UNITED STATES PATENT OFFICE.

HARRY ZIMMERMAN, OF FREMONT, OHIO.

APPARATUS FOR FEEDING AND CUTTING MULTIPLE FABRICS.

No. 847,536.     Specification of Letters Patent.     Patented March 19, 1907.

Application filed June 27, 1906. Serial No. 323,665.

*To all whom it may concern:*

Be it known that I, HARRY ZIMMERMAN, a citizen of the United States, residing at Fremont, in the county of Sandusky and State of Ohio, have invented certain new and useful Improvements in Apparatus for Feeding and Cutting Multiple Fabrics, of which the following is a specification.

In the manufacture of many articles—as corsets, collars, cuffs, &c.—it is common to lay a series of strips of fabric one upon the other, to extend the end of the multiple mass over a cutting-board, and to cut through the mass by dies or cutters operated by a suitable press, and as all of that portion which is upon the cutting-board is cut away to draw the mass of material lengthwise to bring an uncut portion thereof above the board and repeat the cutting operations. This is attended with great difficulty and much labor, because the mass is exceedingly heavy, for which reason it becomes necessary to operate upon comparatively limited amounts of material, including strips of limited length, and the shorter the length and the more frequently operations upon new strips are required the greater is the amount of waste and loss, because it is not practicable to so cut the sections from the fabric that there will be no waste as the end of the fabric is reached.

To facilitate the operations and to enable me to operate on strips of extended length while handling the great mass of material with ease and despatch, I make use of the apparatus hereinafter described, and illustrated in the accompanying drawing, in which—

Figure 1:
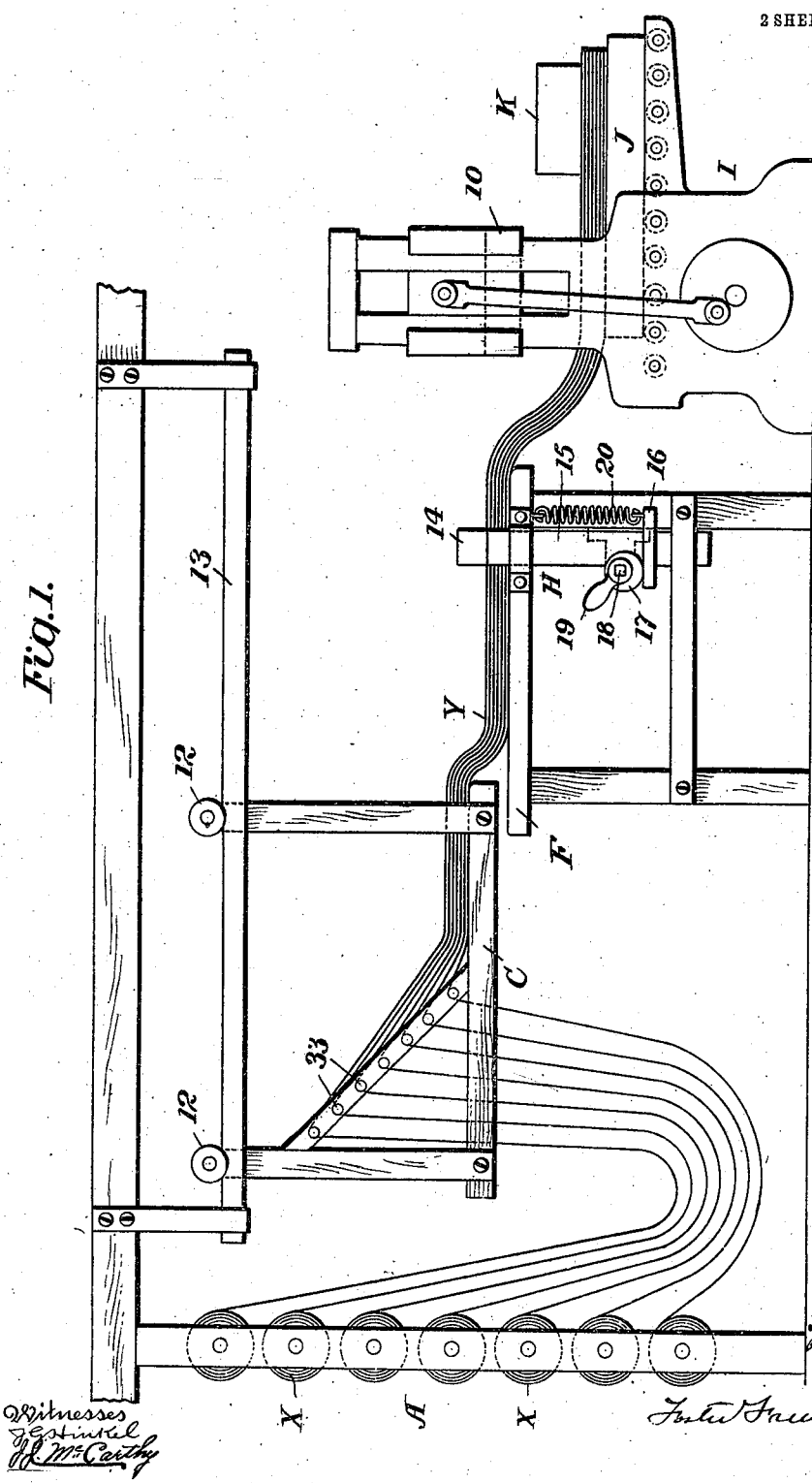
Figure 2:
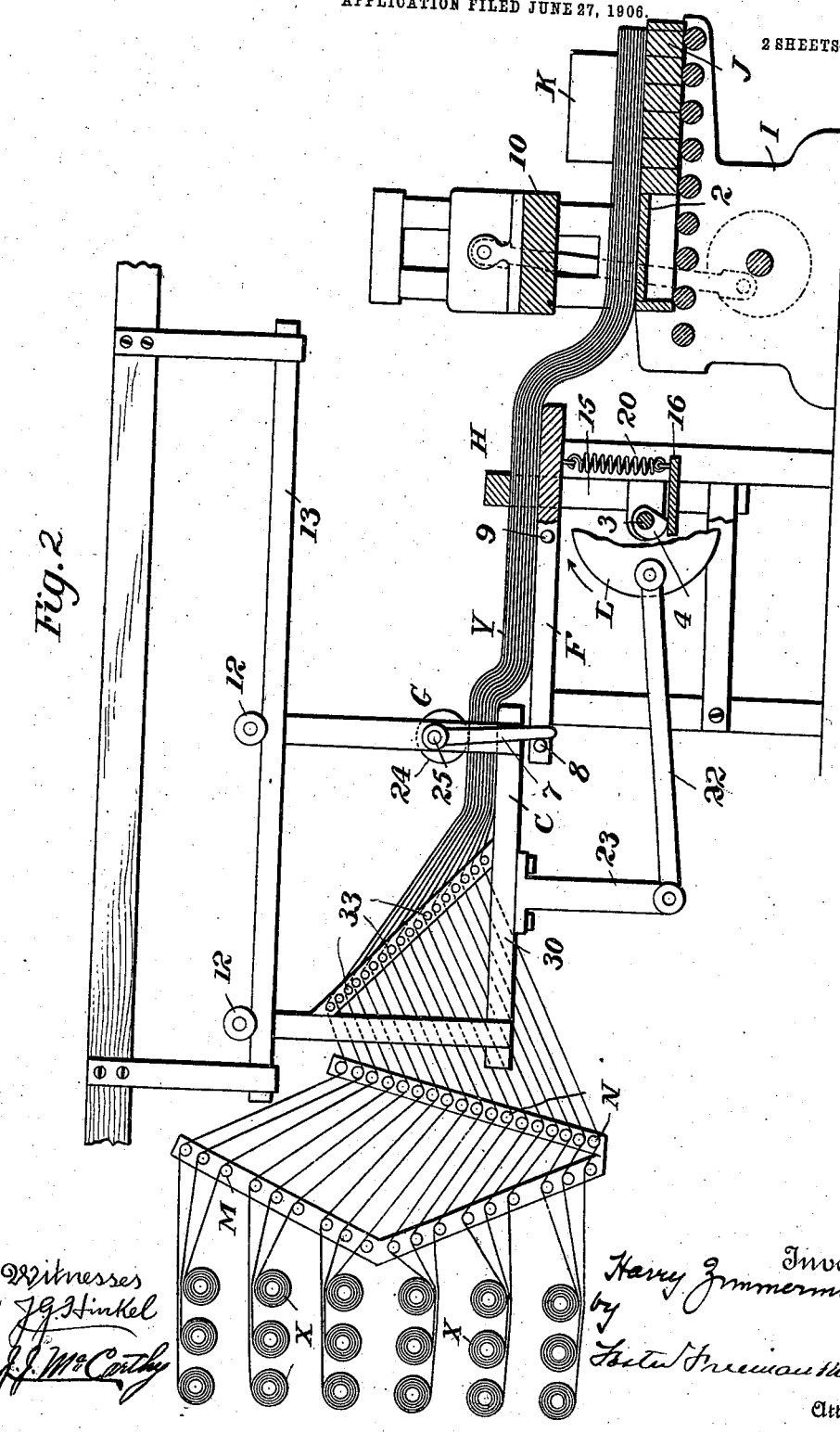

Figure 1 is an elevation illustrating my apparatus as adapted for use where power is not applied for moving the multiple fabric, and Fig. 2 is an elevation illustrating the arrangement where the apparatus is driven by power.

Referring first to Fig. 1, I illustrates a press which may be of any suitable character and which is provided with a cutting-board J, adapted to slide back and forth upon a roller-bed beneath the platen 10 of the press, and A represents a frame or support for a series of rolls of fabrics X which is to be cut. In practice as many as fifty of said rolls will be employed at one time; but for purposes of illustration I have shown a more limited number, the strips being drawn from the different rolls and brought together in a mass Y, which is carried beneath the platen 10 and onto the cutting-board J, and the cutters K are placed upon the mass when the board is carried beyond the platen, as shown, and the board is then pushed back under the platen and the latter brought down upon the cutters, which are forced through the mass.

Between the press and support A for the rolls I arrange a carriage C, which is suitably guided so that it may be reciprocated back and forth, and with a platform 30 so arranged that it will support the mass of material. The carriage may be provided with wheels adapted to suitable tracks. As shown, it has wheels 12, adapted to the rails of an elevated track 13, and it will be seen that if the attendant draws the strips from the rolls X so as to leave the desired amount of material hanging in loops between the support A in the carriage a draft upon the material to pull the end of the mass over the cutting-board J will result in carrying the carriage toward the press, the carriage thus supporting the main weight of the material, so that the feeding operation is greatly facilitated. In some cases the carriage alone is interposed between the rolls and the press and can be operated as above described; but the operation may be greatly facilitated by the use of a table F intermediate the carriage and the press and supporting the material between the two, and in order that the different strips may be adjusted so that all of their edges may be brought into line upon the same vertical plane I provide the carriage with a series of parallel supports or guides 33 in the form of rolls arranged upon an inclined plane, as shown, the different strips being passed over the different rolls and each being, therefore, capable of lateral adjustment independent of the other.

To prevent the material from being dragged from the press when the carriage is moved back toward the rolls, I provide a clamp H, by means of which the mass can be clamped to the table F as the carriage moves backward. As shown, the clamp consists of a suitably-guided cross-bar 14, connected with a frame 15, extending below the table, and with a cross-bar 16, against which may be brought eccentrics 17 upon a shaft 18, provided with a handle 19, so that by turning the said shaft by means of the handle the cross-bar can be brought with the desired pressure upon the mass of material to clamp the same to the table, a spring 20 serving to elevate the frame and cross-bar when the handle is swung in the opposite direction.

In the construction shown in Fig. 2 the apparatus is provided with an operating-shaft 3, carrying crank-wheels L, from the wrist-pins of which connecting-rods 22 extend to arms 23 of the carriage C, so that the rotation of the shaft is the means of reciprocating the carriage. In order that the clamp H may be applied as the carriage moves back, I provide the shaft 3 with a cam 4 for engaging the cross-bar 16 of the frame 15 and for holding the clamp down during the entire backward movement of the carriage and releasing it as the carriage reaches the limit of its movement. In order that the forward movement of the carriage may draw the material directly from the rolls without the necessity of pulling it down into loops by hand to secure slack portions, I provide the carriage with a clamping device G, shown as a cylinder 24, arranged eccentrically upon a shaft 25, provided at the end with an arm 7, and stop-pins 8 9 are arranged upon the table F, so that as the carriage reaches its position nearest the rolls the shaft 25 will be turned so as to cause the fabric to be clamped to the carriage, and as the carriage approaches the clamp H the arm 7 will contact with the stop 9 and swing the clamp G so as to release the pressure upon the fabric and permit the operator to move the mass upon the cutting-board J to its desired position—an operation which may be readily effected, owing to the limited amount of material between the carriage and the press which has to be moved. In order to facilitate the support and adjustment of the material upon the cutting-board, I prefer to provide the latter with an extension 2, which will support part of the material between the cutting-board and the table F. In the construction shown in Fig. 2, where it is not necessary to draw the material from the rolls by hand and have it hang in loops, I make use of a series of guides M, arranged to receive the material that passes from the rolls X, bringing them in their proper relation to each other, and in order to then bring the various strips into closer proximity and still in proper relation I make use of another series of guides N, closer spaced than the guides M, and from the guides N the material passes to the series of guides 33 to the carriage C, the material passing in straight lines between its guides and being drawn upon these lines by the movement of the carriage toward the press.

By the above-described arrangement I am enabled to make use of rolls of material containing continuous strips of great length and to thereby avoid the loss which results from cutting up shorter strips. I am enabled to feed the material in heavy masses from the rolls to the press without great exertion on the part of the operator and with the use of a limited amount of labor even when no power is employed, and when power is employed the operator at the press can practically control the entire movement of the fabric. For these reasons also the operations are greatly expedited, so that the product per day of the cutting operations is increased many times over the result of apparatus heretofore employed.

Without limiting myself to the details of construction shown, I claim—

1. In an apparatus for cutting multiple fabrics, the combination with the cutting press, of supports for a series of rolls of fabric, and a carriage supporting the material between the rolls and press and movable back and forth between the two.

2. In an apparatus for cutting multiple fabrics, the combination with the cutting-press, of supports for a series of rolls of fabric, a carriage supporting the material between the rolls and press and movable back and forth between the two, and means for clamping the material to the carriage and for unclamping the same.

3. In an apparatus for cutting multiple fabrics, the combination with the cutting-press, of supports for a series of rolls of fabric, a carriage supporting the material between the rolls and press and movable back and forth between the two, and means for automatically clamping the material to the carriage and for unclamping the same.

4. In an apparatus for cutting multiple fabrics, the combination of the cutting-press, means for supporting a series of rolls of fabric, an intermediate carriage, and means for reciprocating the carriage between the rolls and the press.

5. In an apparatus for cutting multiple fabrics, the combination of the cutting-press, means for supporting a series of rolls of fabric, an intermediate carriage, means for clamping the material automatically to the carriage and releasing it, and means for reciprocating the carriage between the rolls and the press.

6. In an apparatus for cutting multiple fabrics, means for supporting rolls of fabric, a cutting-press, an intermediate carriage sliding between the two, and a supporting-table for the fabric between the carriage and press.

7. In an apparatus for cutting multiple fabrics, means for supporting rolls of fabric, a cutting-press, and intermediate carriage sliding between the two, a supporting-table for the fabric between the carriage and press, and means for clamping the material to the carriage and table.

8. In an apparatus for cutting multiple fabrics, means for supporting rolls of fabric, a cutting-press, and intermediate carriage sliding between the two, a supporting-table for the fabric between the carriage and press, and means for automatically clamping the material to the carriage and table.

9. The combination with the supports of a series of rolls of fabric, and with a cutting-press, of an intermediate carriage, supports upon which the carriage reciprocates, and a series of superposed separated supports on said carriage whereby to permit the separate lateral adjustment of the superposed strips of fabric.

In testimony whereof I affix my signature in presence of two witnesses.

HARRY ZIMMERMAN.

Witnesses:
   CHARLES E. FOOTE,
   EDWIN S. CLARKSON.